(12) United States Patent
Collina et al.

(10) Patent No.: US 6,365,685 B1
(45) Date of Patent: Apr. 2, 2002

(54) PROCESS FOR THE PREPARATION OF RANDOM PROPYLENE COPOLYMERS AND PRODUCTS OBTAINED THEREFROM

(75) Inventors: Gianni Collina, Casalecchio di Reno; Giampiero Morini, Padua, both of (IT)

(73) Assignee: Remall North America, Wilmington, DE (US)

( * ) Notice: Subject to any disclaimer, the term of this patent is extended or adjusted under 35 U.S.C. 154(b) by 0 days.

(21) Appl. No.: 09/413,281

(22) Filed: Oct. 6, 1999

Related U.S. Application Data

(62) Division of application No. 08/807,483, filed on Feb. 27, 1997.

(30) Foreign Application Priority Data

Feb. 27, 1996 (IT) .......................................... MI96A0357

(51) Int. Cl.$^7$ ................................................. C08F 4/44
(52) U.S. Cl. ................................ 526/124.3; 526/124.1; 526/142; 526/158; 526/97; 526/348; 526/348.6; 526/352; 526/351
(58) Field of Search .......................... 526/124.1, 124.3, 526/142, 158, 97, 348, 348.6, 352, 351

(56) References Cited

U.S. PATENT DOCUMENTS

| | | | |
|---|---|---|---|
| 4,399,054 A | | 8/1983 | Ferraris et al. |
| 4,978,648 A | * | 12/1990 | Barbe et al. ................ 502/127 |
| 4,990,479 A | * | 2/1991 | Ishimaru et al. ............ 502/125 |
| 5,221,651 A | * | 6/1993 | Sacchetti et al. ........... 502/126 |
| 5,541,260 A | * | 7/1996 | Pelliconi et al. ............ 525/240 |
| 5,618,895 A | | 4/1997 | Kerth et al. |

FOREIGN PATENT DOCUMENTS

| | | |
|---|---|---|
| EP | 0 318 049 | 5/1989 |
| EP | 0 341 724 | 11/1989 |
| EP | 0 395 083 | 10/1990 |
| EP | 0 450 456 A2 | 3/1991 |
| EP | 0 452 156 * | 10/1991 |

OTHER PUBLICATIONS

Derwent Abstract and family information for EP 0 450 456 A2.

* cited by examiner

Primary Examiner—David W. Wu
Assistant Examiner—Ling-Siu Choi
(74) Attorney, Agent, or Firm—Bryan Cave LLP

(57) ABSTRACT

The present invention relates to a process for the preparation of random copolymers of propylene with $c_2$–$c_{10}$ α-olefins, carried out in the presence of a catalyst comprising:

A) A solid component comprising a titanium compound supported on $mgcl_2$ in active form and an electron-donor compound;

b) An alkyl-al compound, and c) An electron-donor compound selected from the group of 1,3-diethers.

The copolymers obtained using the said process show, for an equivalent content of α-olefin, a lower content of xylene-soluble fractions when compared with the copolymers obtained with the catalysts of the prior art.

42 Claims, No Drawings

PROCESS FOR THE PREPARATION OF RANDOM PROPYLENE COPOLYMERS AND PRODUCTS OBTAINED THEREFROM

This is a division of U.S. application Ser. No. 08/807,483, filed Feb. 27, 1997 pending.

The present invention relates to a process for the preparation of random copolymers of propylene with ethylene or other α-olefins. The invention moreover relates to random propylene copolymers which have excellent properties in terms of low content of xylene-solubles. In particular, the present invention relates to a process for the preparation of random propylene copolymers, carried out in the presence of a catalytic system comprising: (A) a solid component comprising a Ti compound supported on $MgCl_2$ and an electron-donor compound, (B) an alkylaluminium compound and (C) an external electron-donor compound selected from the group of 1,3-diethers.

Copolymers containing from 85 to 99% by weight of propylene and from 1 to 15% by weight of ethylene and/or another α-olefin, in which the comonomer is randomly distributed in the polypropylene chain, are generally known as random propylene copolymers. Compared with propylene homopolymers, the said copolymers have a molecular structure which is disturbed by the presence of the comonomer, leading to a substantially inferior degree of crystallinity therein. As a result, random copolymers have a sealing temperature and a modulus of elasticity which are lower than those of propylene homopolymers. These characteristics make the said copolymers particularly useful in the preparation of films or articles in which improved impact resistance and low sealing initiation temperatures (S.I.T.) are required. However, the introduction of the comonomer into the polypropylene chain leads to a significant increase in the fraction of polymer which is soluble in xylene at 25° C., the said soluble polymer being mainly composed of low molecular weight chains and containing percentages of comonomer which are higher than the average content of comonomer calculated on the basis of the total polymer. The amount of soluble fraction generally increases as the content of comonomer in the copolymer increases and, beyond defined limits, precludes the use of the copolymers in certain sectors, for example in the preparation of films for wrapping food, unless recourse is made to a costly stage of elimination of the soluble fraction. The presence of relevant amounts of the said fractions therefore decreases the flowability of the polymer granules, thereby making operations such as discharging and transferring the polymer difficult and giving rise to problems of management of the polymerization plant. Moreover, the presence of the said soluble fractions in significant amounts leads over time to phenomena of deterioration of the optical properties owing to migration of these fractions to the surface (blooming).

It is therefore necessary to have available a catalyst which has a tendency to produce low levels of soluble fractions and which, at the same time, is capable of distributing the comonomer satisfactorily in the polypropylene chain so as to obtain the desired effect (lowering of the modulus and/or lowering of the sealing initiation temperature) with low contents of comonomer. Moreover, the said catalyst must possess an activity such that it produces a copolymer which has very low levels of catalytic residues (Ti<15 ppm), so as to make a further removal stage unnecessary.

It is known from European patent EP-B-318,049 that stereorigid and chiral zirconocenes used as catalysts in the polymerization of olefins are capable of giving, in high yields, random propylene copolymers having a low content of xylene-solubles. However, the said copolymers have a very narrow molecular weight distribution which makes them difficult to process using standard techniques and process apparatus.

European patent application EP-A-341,724 describes a process for the preparation of random propylene copolymers carried out in the gas phase, in the presence of a catalytic system consisting of: a solid catalytic component (i) consisting of magnesium, titanium, halogen and an electron-donor compound belonging to the group of polycarboxylic acid esters; an alkylaluminium (ii); an external electron-donor compound (iii) having at least one Si—O—C bond. The amount of xylene-solubles in the copolymers is, however, still high (19% by weight of solubles with 6.7% by weight of ethylene).

It has now surprisingly been found a process which is capable of providing, in high yields, random propylene copolymers having a particularly low content of xylene-soluble fractions. It is therefore an object of the present invention a process for the preparation of propylene copolymers containing up to 15% by weight of ethylene and/or of an α-olefin $CH_2=CHR^1$, where $R^1$ is a hydrocarbon radical having from 2 to 10 carbon atoms, the said process being carried out in the presence of a catalyst comprising:

(A) a solid component comprising a Ti compound containing at least one Ti-halogen bond supported on magnesium chloride in active form and an electron-donor compound;

(B) an alkyl-Al compound; and (C) an electron-donor compound selected from the group of 1,3-diethers of formula (I):

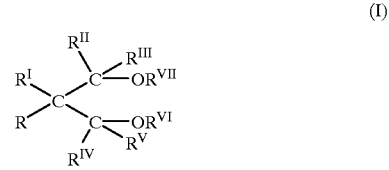

in which R, $R^I$, $R^{II}$, $R^{III}$, $R^{IV}$ and $R^V$, which are identical or different, are hydrogen or linear or branched alkyl radicals, cycloalkyl radicals, aryl radicals, alkylaryl radicals or arylalkyl radicals having 1–18 carbon atoms, with the proviso that R and $R^I$ cannot simultaneously be hydrogen; $R^{VI}$ and $R^{VII}$, which are identical or different, are linear or branched alkyl radicals, cycloalkyl radicals, aryl radicals, alkylaryl radicals or arylalkyl radicals having 1–18 carbon atoms; at least two of the said radicals from R to $R^{VII}$ can be linked together to form one or more cyclic structures.

The α-olefin $CH_2=CHR^1$ is preferably butene or hexene.

The magnesium chloride in active form present in the solid component (A) is widely known in the art and is characterized by an X-ray spectrum in which the most intense diffraction line appearing in the spectrum of the non-activated chloride shows a decreased intensity and in said spectrum a halo appears the maximum intensity of which is shifted towards lower angles with respect to those of the most intense line. The preferred Ti compounds are $TiCl_4$ and $TiCl_3$; however, Ti haloalkoxides of formula $Ti(OR)_{n-y}X_y$ where n is the valency of the titanium and y is a number between 1 and n, can also be used.

The internal electron-donor compound may be selected from esters, ethers, amines and ketones. It is preferably selected from alkyl, cycloalkyl or aryl esters of monocarboxylic acids, for example benzoic acid, or polycarboxylic acids, for example phthalic or maleic acid, the said alkyl, cycloalkyl or aryl groups having from 1 to 18 carbon atoms. Examples of the said electron-donor compounds are methyl benzoate, ethyl benzoate and diisobutyl phthalate.

The solid component (A) can conveniently be prepared by reaction between a titanium compound of formula Ti(OR)$_{n-m}$X$_m$, where n is the valency of the titanium and m is a number between 1 and n, and a MgCl$_2$.pROH adduct, where p is a number from 0.1 to 4 and R is a hydrocarbon radical having 1–18 carbon atoms. The adduct can conveniently be prepared in spherical form by mixing the alcohol and the magnesium chloride, under stirring conditions, in an inert hydrocarbon which is immiscible with the adduct and operating at the melting point of the adduct (100–130° C.). The emulsion thus obtained is then cooled rapidly, causing the adduct to solidify in the form of spherical particles. Examples of the preparation of adducts in spherical form are described in U.S. Pat. No. 4,399,054. The so obtained adduct generally contains from 2 to 4 moles of alcohol per mole of MgCl$_2$. The adduct can be directly reacted with the titanium compound or can be previously subjected to a thermal controlled dealcoholation (between 80 and 130° C.) so as to reduce the alcohol content to less than 2 mol, preferably between 0.1 and 1.5 mol.

The reaction between the adduct and the titanium compound (preferably TiCl$_4$) can be carried out by suspending the MgCl$_2$-alcohol adduct in cold (generally 0° C.) TiCl$_4$; the mixture is then brought to a temperature of 80–135° C. and maintained at this temperature for 0.5–2 hours. The internal electron-donor compound can be added to the TiCl$_4$ in molar ratios of between 1:6 and 1:16 relative to the MgCl$_2$. The treatment with TiCl$_4$ may be repeated one or more times. Examples of catalysts prepared according to this process are described in EP-A-395,083. The catalysts obtained according to the process described have a surface area (measured by B.E.T. method) generally of between 20 and 400 m$^2$/g and preferably between 50 and 350 m$^2$/g, and a porosity (measured by B.E.T. method) generally greater than 0.2 cm$^3$/g, preferably of between 0.2 and 0.5 cm$^3$/g.

The use of the catalyst component disclosed above allows the preparation of polymers in spherical form which make unnecessary the pellettization step.

The alkyl-Al compound (B) is used in Al/Ti molar ratios of between 10 and 1000, preferably of between 10 and 100. The compound (B) is preferably selected from trialkyl-Al compounds such as trimethyl-Al, triethyl-Al, triisobutyl-Al, tri-n-butyl-Al and tri-n-octyl-Al. Mixtures of trialkyl-Al compounds with alkyl-Al halides or alkyl-Al sesquihalides such as AlMe$_2$Cl, AlEt$_2$Cl and Al$_2$Et$_3$Cl$_3$ may also be used, as may compounds containing two or more Al atoms attached together via O or N atoms or SO$_3$ or SO$_4$ groups.

The electron-donor compound (C) is preferably selected from 1,3-diethers of formula (I) in which at least one of R and R$^I$ is a secondary or tertiary hydrocarbon radical of the alkyl, cycloalkyl or aromatic type. Preferably, at least one of R and R$^I$ is selected from isopropyl, sec-butyl, tert-butyl, cyclobutyl, cyclopentyl and phenyl which are optionally substituted. R$^{VI}$ and R$^{VII}$ are preferably methyls, while R$^{II}$, R$^{III}$, R$^{IV}$ and R$^{VII}$ are preferably hydrogen. Representative examples of compounds of formula (I) which can be used in the process of the invention are: 2-methyl-2-isopropyl-1,3-dimethoxypropane, 2,2-diisobutyl-1,3-dimethoxypropane, 2,2-di-phenyl-1,3-dimethoxypropane, 2,2-dibenzyl-1,3-dimethoxypropane, 2,2-bis(cyclohexylmethyl)-1,3-dimethoxypropane, 2,2-diisobutyl-1,3-dibutoxypropane, 2,2-diisobutyl-1,3-diethoxypropane, 2-isopentyl-2-isopropyl-1,3-di-methoxypropane, 2,2,4-trimethyl-1,3-dimethoxypentane, 1,1'-bis(methoxymethyl)cyclohexane, (±)-2,2'-bis(methoxymethyl)norbornane, 2-isopropyl-2-(3, 7-dimethyloctyl)-1,3-dimethoxypropane, 2,2-diisopropyl-1, 3-dimethoxy-propane, 2-isopropyl-2-cyclohexylmethyl-1,3-dimethoxy-propane, 2,2-diisopentyl-1,3-dimethoxypropane, 2-iso-propyl-2-cyclohexyl-1,3-dimethoxypropane, 2-isopropyl-2-cyclopentyl-1,3-dimethoxypropane, 2,2-dicylcopentyl-1,3-dimethoxypropane, 2-heptyl-2-pentyl-1, 3-dimethoxy-propane, 2,2-dicyclohexyl-1,3-dimethoxypropane, 2,2-di-propyl-1,3-dimethoxypropane, 2-isopropyl-2-isobutyl-1,3-dimethoxypropane. Among these, the preferred compounds are 2,2-diphenyl-1,3-dimethoxypropane,2,2-bis-(cyclohexylmethyl)-1,3-dimethoxypropane, 2,2-diisopropyl-1,3-dimethoxypropane, 2-isopropyl-2-cyclohexylmethyl-1,3-dimethoxypropane, 2,2-dicyclopentyl-1,3-di-methoxypropane and 2-isopropyl-2-isopentyl-1,3-dimethoxypropane.

The electron-donor compound (C) is used in amounts so as to give a molar ratio between the alkyl-Al compound and the said compound (C) generally of between 0.5 and 50, preferably of between 1 and 30 and more preferably of between 1 and 10. The polymerization process may be carried out according to known methodologies, for example by suspension polymerization using one or more inert hydrocarbon solvents as diluents or in liquid monomer, that is using propylene as the liquid reaction medium. It is moreover also possible to carry out the process in the gas phase, working in one or more fluidized-bed or mechanically stirred reactors.

The polymerization is generally carried out at temperatures of between 20 and 120° C., preferably of between 40 and 80° C. When the process is carried out in the gas phase, the operating pressure is generally between 0.5 and 10 MPa, preferably between 1 and 2 MPa. In the case of polymerization in liquid monomer, however, the operating pressure is between 1 and 5 MPa, preferably between 1.5 and 3 MPa. Hydrogen or other compounds having the same function may be used as molecular weight regulators.

A further aspect of the present invention relates to specific random propylene-ethylene copolymers which are obtainable using the process of the present invention. The said copolymers have the following characteristics:

ethylene content of between 0.1 and 15% by weight;

molecular weight distribution (MWD), expressed in terms of Mw/Mn, greater than 2.5;

content of catalytic residues, expressed in terms of ppm of Ti, less than 15;

natural logarithm of the content by weight of xylene-soluble fraction and weight percentage of ethylenic units, calculated on the basis of the total polymer, such that the point defined by these values falls below the straight line given by the equation:

$$ln(Xs)=ln(a)+bC_2$$

in which:

Xs=% by weight of the fraction soluble in xylene at 25° C.;

C$_2$=% by weight of ethylenic units in the copolymer;

a=1.73;

b=0.29.

The ethylene content of the copolymers is preferably between 0.5 and 10%, more preferably between 1 and 6%. The copolymers of the invention preferably have an MWD of greater than 3, and more preferably of greater than 3.5.

The amount of catalytic residues is preferably less than 10 and more preferably less than 2 ppm of Ti.

Copolymers in which the natural logarithm of the content by weight of xylene-soluble fraction and the weight percentage of ethylenic units define points located below the straight line given by the equation given above in which a=1.68, and more preferably below the straight line given above in which a=1.55 are, moreover, particularly preferred.

It has also been noted that the ethylene/propylene copolymers of the present invention have a favourable balance between the content of xylene-soluble fraction and the melting point relative to a given comonomer content. In particular, these are characterized in that they have a natural logarithm of the ratio content of xylene-solubles/melting point in correspondence to the value of comonomer content such that the point defined by said values falls below the straight line given by the equation:

$$ln(Xs/Tm)=ln(c)+dC_2$$

where:
- $Xs$=% by weight of the fraction soluble in xylene at 25° C.;
- $C_2$=% by weight of ethylene units in the copolymer;
- c=0.009;
- d=0.32.

Preferably, c is 0.007 and more preferably 0.005.

Another particular aspect of the present invention regards specific random propylene-butene copolymers which are obtainable using the process of the present invention. The said copolymers have the following characteristics:
- butene content of between 0.1 and 15% by weight;
- molecular weight distribution (MWD), expressed in terms of Mw/Mn, greater than 2.5;
- content of catalytic residues, expressed in terms of ppm of Ti, less than 15;
- natural logarithm of the content by weight of xylene-soluble fraction and weight percentage of butene units, calculated on the basis of the total polymer, such that the point defined by these values falls below the straight line given by the equation:

$$ln(Xs)=ln(e)+fC_4$$

in which:
- $Xs$=% by weight of the fraction soluble in xylene at 25° C.;
- $C_4$=% by weight of butene units in the copolymer;
- e=1.57;
- f=0.08.

The butene content of the copolymers is preferably between 0.5 and 10%, more preferably between 1 and 6%. The copolymers of the invention preferably have an MWD of greater than 3, and more preferably of greater than 3.5. The amount of catalytic residues is preferably less than 10 and more preferably less than 2 ppm of Ti.

Copolymers in which the natural logarithm of the percentage by weight of xylene-soluble fraction and the weight percentage of butene units define points located below the straight line corresponding to the equation given above in which e=1.52, and more preferably below the straight line given above in which e=1.47 are, moreover, particularly preferred.

As mentioned, random propylene copolymers having the characteristics described above, are particularly suitable for use in the preparation of low seal temperature films. When used in these applications, the said copolymers show, surprisingly, an improved SIT/amount of hexane-solubles balance compared with conventional copolymers.

The following examples are given by way of non-limiting illustration of the invention.

Characterization

Melt Index (MIL)

ASTM D-1238, condition "L".

Comonomer Content

Percentage by weight of comonomer determined by IR spectrum.

Intrinsic viscosity [η]

ASTM 2857-70.

Differential Scanning Calorimetry (DSC)

Measurements taken on a DSC-7 instrument from Perkin Elmer Co. Ltd. according to the following procedure. About 10 mg of sample are heated to 180° C. at a scanning rate of 20° C./min; the sample is kept at 180° C. for 5 min and is then cooled at a scanning rate of 20° C./min. A second scan is then carried out in the same way as for the first. The values reported are those obtained in the second scan.

Determination of the average MWD

This is determined by GPC using a Waters 150 machine equipped with a TSK column set (type GM-HT$_{xt}$) working at 135° C. with 1,2-dichlorobenzene as solvent (stabilized with 0.1 vol% of 2,6-di-t-butyl p-cresole (BHT)). Monodisperse fractions of polystyrene were used as standard. The universal calibration for PP copolymers was performed by using a linear combination of the Mark-Houwink constants for PP and PE.

Solubility in xylene 2.5 g of copolymer and 250 cm$^3$ of o-xylene are placed in a glass flask fitted with a condenser and a magnetic stirrer. The temperature is increased to the boiling point of the solvent over 30 min. The clear solution thus formed is left at reflux with stirring for a further 30 min. The closed flask is then placed in a bath of ice-water for 30 min and then in a bath of water thermostatically adjusted to 25° C. for 30 min. The solid formed is then filtered off on filter paper at a high filtration rate. 100 cm$^3$ of the liquid obtained from the filtration are poured into a pre-weighed aluminium container, which is placed on a hot-plate to evaporate off the liquid under a stream of nitrogen. The container is then placed in an oven at 80° C. and maintained under vacuum until a constant weight is obtained.

Catalytic Residues (ppm Ti)

The ppm of titanium in the polymer are calculated on the basis of the polymerization yield and on the percentage by weight of Ti present in the solid component.

Sealing Temperature (WIT)

This is defined as the temperature required to seal two films in order to obtain a sealing breaking load of greater than 0.250 kg/cm$^2$. It is determined on a film 20 μm in thickness obtained according to the following procedure: the polymer, to which stabilizers have been added, is extruded into a film 50 μm in thickness. The film thus obtained is coupled with a PP homopolymer film 500 μm in thickness and is subjected to biaxial orientation in both the MD and CD directions until a total thickness of less than 20 μm is obtained.

Determination of the Solubility in Hexane

FDA No. 1771520

EXAMPLES

Preparation of the MgCl$_2$/Alcohol Adduct

The spherical MgCl$_2$/alcohol adduct was prepared according to the method described in Example 2 of U.S. Pat.

No. 4,399,054, working at 3000 rpm instead of 10,000 rpm. The adduct is then partially dealcoholated by heating it in a stream of nitrogen at temperatures increasing from 30 to 180° C.

Preparation of the Catalytic Component (A)

This was prepared according to the general procedure described in EP 395,083, producing a solid having the following composition:

Mg 16.7% by weight
Cl 56.2% by weight
Ti 2.35% by weight
DIBP 7.2% by weight

Example 1

0.0255 g of a catalytic component (A) prepared according to the procedure described above were placed in contact with 0.457 g of triethylaluminium (TEAL) and 0.320 g of 2,2-dicyclopentyl-1,3-dimethoxypropane in 5 cm$^3$ of hexane in a 50 cm$^3$ glass round-bottomed flask. The mixture was introduced into a 4.25 l steel autoclave, previously purged by flushing successively with hexane at 80° C. for one hour and then with propylene gas at 80° C. for one hour. 1450 g of liquid propylene, 9.7 g of ethylene and 3700 cm$^3$ of H$_2$ were then introduced at 25° C. The temperature was brought to 70° C. and the mixture polymerized for 90 minutes, adding 18 g of ethylene and 3700 cm$^3$ of H$_2$. 863 g of random poly-(propylene-ethylene) copolymer having the characteristics reported in Table 1 were obtained.

Example 2

The process was carried out using the same catalyst as that described in Example 1, using 0.0411 g of the solid catalytic component with the same amounts of TEAL and 1,3-diether. 1458 g of liquid propylene, 6 g of ethylene and 2500 cm$^3$ of H$_2$ were introduced into the autoclave at 25° C. The temperature was brought to 70° C. and the mixture polymerized for 120 min, adding 12.3 g of ethylene and 2145 cm$^3$ of H$_2$. 953 g of random poly(propylene-ethylene) copolymer having the characteristics reported in Table 1 were obtained.

Example 3

0.0178 g of the same solid component described in Example 1, 0.457 g of TEAL and 0.288 g of 2,2-diphenyl-1,3-dimethoxypropane as external electron-donor compound were used. The same polymerization procedure was followed, introducing 1297 g of liquid propylene, 12.5 g of ethylene and 3000 cm$^3$ of H$_2$ at 25° C. The temperature was brought to 70° C. and the mixture polymerized for 120 min, adding 27.3 g of ethylene and 2800 cm$^3$ of H$_2$. 606 g of random poly(propylene-ethylene) copolymer having the characteristics reported in Table 1 were obtained.

Example 4

The process was carried out using the same catalyst as that described in Example 1, using 0.0186 g of the catalytic component with the same amounts of TEAL and 1,3-diether described in Example 3. 1297.3 g of liquid propylene, 17 g of ethylene and 3000 cm$^3$ of H$_2$ were introduced into the autoclave at 25° C. The temperature was brought to 70° C. and the mixture polymerized for 120 min, adding 41.3 g of ethylene and 3000 cm$^3$ of H$_2$. 731 g of random poly (propylene-ethylene) copolymer having the characteristics reported in Table 1 were obtained.

Example 5

The process was carried out using the same catalyst as that described in Example 4, using 0.0142 g of the catalytic component with the same amounts of TEAL and 1,3-diether. 1297.3 g of liquid propylene, 20.95 g of ethylene and 3000 cm$^3$ of H$^2$ were introduced into the autoclave at 25° C. The temperature was brought to 70° C. and the mixture polymerized for 120 min, adding 31.6 g of ethylene and 3000 cm$^3$ of H$_2$. 433 g of random poly(propylene-ethylene) copolymer having the characteristics reported in Table 1 were obtained.

Example 6 (Comparative)

0.0197 g of the solid catalytic component described in Example 1 were used, with 0.457 g of TEAL and 0.251 g of cyclohexylmethyldimethoxysilane as external electron-donor compound. The same polymerization procedure as that described in Example 1 was used, adding 1458.4 g of liquid propylene, 13.5 g of ethylene and 2500 cm$^3$ of H$_2$ at 25° C. The temperature was brought to 70° C. and the mixture polymerized for 120 minutes, adding 20.6 g of ethylene and 2500 cm$^3$ of H$_2$, to obtain 403 g of random poly(propylene-ethylene) copolymer having the characteristics reported in Table 1.

Example 7 (Comparative)

0.17 g of the solid catalytic component described in Example 1 and the same amounts of TEAL and cyclohexylmethyldimethoxysilane described in Example 6 were used. The :43 same polymerization procedure was used, adding 1458 g of liquid propylene, 13.5 g of ethylene and 2500 cm$^3$ of H$_2$ at 25° C. The temperature was brought to 70° C. and the mixture polymerized for 120 minutes, adding 24.5 g of ethylene and 2500 cm$^3$ of H$_2$. 602 g of random poly-(propylene-ethylene) copolymer having the characteristics reported in Table 1 were obtained.

Example 8 (Comparative)

0.0278 g of the solid catalytic component described in Example 1 were used, with 0.4567 g of TEAL and 0.3045 g of dicyclopentyldimethoxysilane as external electron-donor compound. The same polymerization procedure was used, adding 1458 g of liquid propylene, 9.7 g of ethylene and 2500 cm$^3$ of H$_2$ at 25° C. The temperature was brought to 70° C. and the mixture polymerized for 120 minutes, adding 19.5 g of ethylene and 3000 cm$^3$ of H$_2$. 903 g of random poly(propylene-ethylene) copolymer having the characteristics reported in Table 1 were obtained.

Example 9

0.0118 g of the solid catalytic component of Example 1 were placed in contact with 0.457 g of triethylaluminium (TEAL) and 0.0513 g of 2,2-diphenyl-1,3-dimethoxypropane in 9 cm$^3$ of hexane in a 50 cm$^3$ glass round-bottomed flask. The mixture was introduced into a 4.25 l steel autoclave, previously purged by flushing successively with hexane at 80° C. for one hour and then with propylene gas at 80° C. for one hour. 1297.3 g of liquid propylene, 235.6 g of butene and 4950 cm$^3$ of H$_2$ were then introduced at 25° C. The temperature was brought to 70° C. and the mixture polymerized for 120 minutes, adding 303 g of propylene. 477 g of random poly(propylene-butene) copolymer having the characteristics reported in Table 1 were obtained.

Example 10 (Comparative)

0.015 g of the solid catalyst component described in Example 1 were used, with 0.4567 g of TEAL and 0.04568 g of dicyclopentyldimethoxysilane as external electron-donor compound. The same polymerization procedure was used, adding 1300 g of liquid propylene, 240 g of butene and 4950 cm³ of H₂ at 25° C. The temperature was brought to 70° C. and the mixture polymerized for 120 minutes, adding 255 g of propylene. 960 g of random poly(propylene-butene) copolymer having the characteristics reported in Table 1 were obtained.

Example 11

After having been suitably stabilized, a propylene copolymer containing 5% by weight of ethylene, obtained according to the process of the present invention, having a xylene-soluble fraction content equal to 6.6% is extruded into a film 50 μm in thickness. The SIT and the amount of hexane-solubles are determined for the film obtained, according to the procedures described above. The test results are reported in Table 2.

Example 12 (Comparative)

After having been suitably stabilized, a propylene copolymer containing 5% by weight of ethylene, obtained using a silane as external donor, having a xylene-soluble fraction content equal to 8.5% is extruded into a film 50 μm in thickness. The SIT and the amount of hexane-solubles are determined for the film obtained, according to the procedures described above. The test results are reported in Table 2.

TABLE 1

| Ex. | 1 | 2 | 3 | 4 | 5 | 6 (comp.) | 7 (comp.) | 8 (comp.) | 9 | 10 (comp.) |
|---|---|---|---|---|---|---|---|---|---|---|
| Tm (° C.) | 147.1 | 151.1 | 139.4 | 128.7 | 123.1 | 137.3 | 141.1 | 148.2 | 154.5 | 153 |
| Tc (° C.) | 99.5 | 101.3 | 90.7 | 74.4 | 73.2 | 88.1 | 89.5 | 98.9 | 106.1 | 104 |
| C₂/C₄ (% Wt) | 2.3 | 1.4 | 4 | 6 | 8.15 | 5.2 | 3.57 | 2.2 | 3.0 | 3.9 |
| [η] (dl/g) | 1.6 | 1.9 | 2.3 | 2.6 | 2.39 | 1.82 | 2 | 2 | 1.56 | 1.6 |
| XS (% Wt) | 2.7 | 2.5 | 5.3 | 8.7 | 15.1 | 10.9 | 7.7 | 3.6 | 1.4 | 2.4 |
| Ti (ppm) | 0.7 | 1 | 0.7 | 0.6 | 0.8 | 1.1 | 0.8 | 0.7 | 0.6 | 0.4 |
| Mw/Mn | 6 | 6 | 5.5 | 6 | 5 | 4.5 | 4.5 | 7.5 | 5 | 7 |
| ΔH_f (J/g) | 90.3 | 92 | 80.2 | 77.1 | 67 | 77 | 70.6 | 91 | 94 | 93 |

TABLE 2

| EXAMPLE | C2 (% wt) | SIT | Sol. C6 (wt %) | Xyl. Sol. (% wt) |
|---|---|---|---|---|
| 11 | 5 | 120 | 2.7 | 6.6 |
| 12 (compar.) | 5 | 122 | 3.6 | 8.5 |

What is claimed is:

1. A process for the preparation of random propylene copolymers which contain up to 15% by weight of ethylene, in which the natural logarithm of the content by weight of xylene-soluble fraction and the weight percentage of ethylenic units define points below the straight line given by the equation:

$$ln(Xs)=ln(a)+bC_2$$

wherein

Xs=% by weight of the fraction soluble in xylene at 25° C.;
C₂=% by weight of ethylenic units in the copolymer;
a=from 1.55 to 1.73;
b=0.29;

the process comprising contacting ethylene and propylene in the presence of a catalyst comprising:
(A) a solid component comprising a titanium compound supported on a magnesium chloride in active form and an electron-donor compound;
(B) an alkyl-Al compound; and
(C) an electron donor-compound selected from the group of 1,3-diethers of formula (I):

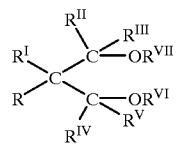

wherein R, R^I, R^II, R^III, R^IV, and, R^V, which are identical or different, are hydrogen or linear or branched alkyl radicals, cycloalkyl radicals, aryl radicals, alkylaryl radicals or arylalkyl radicals having 1–18 carbon atoms;

with the limitation that R and R^I cannot simultaneously be hydrogen and that at least one of R and R^I is a secondary or tertiary hydrocarbon radical selected from alkyl, cycloalkyl, or aromatic groups;

wherein R^VI and R^VII, which are identical or different, are linear or branched alkyl radicals, cycloalkyl radicals, aryl radicals, alkylaryl radicals or arylalkyl radicals having 1–18 carbon atoms;

and further wherein at least two of the radicals R, R^I, R^II, R^III, R^IV, R^V, R^VI, and R^VII can be linked together to form one or more cyclic structures.

2. Process according to claim 1, in which the titanium compound present in the solid component (A) contains at least one Ti-halogen bond.

3. Process according to claim 2, in which the titanium compound has the formula Ti(OR)_{n-y}X_y, where X is a halogen, n is the valency of the titanium and y is a number between 1 and n.

4. Process according to claim 2, in which the titanium compound is TiCl₄.

5. Process according to claim 1, in which the internal electron-donor compound is selected from esters, ethers, amines, silanes and ketones.

6. The process according to claim 5, in which the internal electron-donor compound is selected from alkyl, cycloalkyl or aryl esters of monocarboxylic acids and polycarboxylic acids, the alkyl, cycloalkyl or aryl groups having from 1 to 18 carbon atoms.

7. The process according to claim 1, in which the solid component (A) has a surface area of between 20 and 400 m²/g, and a porosity greater than 0.2 cm³/g.

8. Process according to claim 1, in which the alkyl-Al compound (B) is selected from the following trialkyl-aluminums: trimethyl-Al, triethyl-Al, triisobutyl-Al, tri-n-butyl-Al, and tri-n-octyl-Al.

9. The process according to claim 1, in which at least one of R and R$^I$ is selected from isopropyl, sec-butyl, tert-butyl, cyclobutyl, cyclopentyl, and phenyl, which are optionally substituted.

10. Process according to claim 9, in which the electron-donor compound (C) is selected from: 2,2-diphenyl-1,3-dimethoxypropane, 2,2-bis(cyclo-hexylmethyl)-1,3-dimethoxypropane, 2,2-diisopropyl-1,3-dimethoxypropane, 2-isopropyl-2-cyclohexylmethyl-1,3-dimethoxypropane, 2,2-dicyclopentyl-1,3-dimethoxy-propane, and 2-isopropyl-2-isopentyl-1,3-dimethoxypropane.

11. Process according to claim 1, in which the polymerization is carried out in suspension, using inert hydrocarbon diluents as liquid phase.

12. Process according to claim 1, in which the process is carried out in liquid propylene.

13. Process according to claim 1, in which the polymerization is carried out at temperatures of between 20 and 120° C. and under pressures of between 0.5 and 10 MPa.

14. The process according to claim 6, wherein the internal electron-donor compound is selected from alkyl, cycloalkyl, or aryl esters of benzoic acid, phthalic acid, or maleic acid.

15. The process according to claim 7, wherein the solid component (A) has a surface area of between 50 and 350 m²/g.

16. The process according to claim 7, wherein the solid component (A) has a porosity of between 0.2 and 0.5 cm³/g.

17. The process according to claim 7, wherein between 1.4 and 8.2 % by weight of the copolymer is derived from ethylene, solid component (A) has porosity of between 0.2 and 0.5 cm³/g and a surface area of between 50 and 350 m²/g, component (B) is triethylaluminum, the ratio of component (A) to component (B) is between 0.02 and 0.09, the ratio of component (C)) to component (B) is between 0.6 and 1, the polymerization reaction is in the presence of between 600 and 1200 cm³ H$_2$ per liter of the reaction vessel and said polymerization reaction is carried out at 70° C.

18. The process according to claim 9, wherein R$^{VI}$ and R$^{VII}$ are methyl groups.

19. The process according to claim 9, wherein R$^{II}$, R$^{III}$, R$^{IV}$, and R$^V$ are hydrogen.

20. The process according to claim 9, wherein R$^{II}$, R$^{III}$, R$^{IV}$, and R$^V$ are hydrogen, and R$^{VI}$ and R$^{VII}$ are methyl groups.

21. The process according to claim 1, wherein between 1.4 and 8.2 % by weight of said copolymer is derived from ethylene, solid component (A) has a porosity of between 0.2 and 0.5 cm³/g and a surface area of between 50 and 350 m²/g, component (B) is triethylaluminum, the ratio of component (A) to component (B) is between 0.02 and 0.09, the ratio of component (C)) to component (B) is between 0.6 and 1;

the polymerization reaction is in the presence of between 600 and 1200 cm³ H$_2$ per liter of the reaction vessel, and the polymerization reaction is carried out at 70° C.

22. A process for the preparation of random propylene copolymers which contain up to 15% by weight of butene, in which the natural logarithm of the content by weight of xylene-soluble fraction and the weight percentage of butene units, calculated on the basis of the total polymer, such that the point defined by these values falls below the straight line given by the equation:

$$ln(Xs) = ln(e) + fC_4$$

wherein

Xs=% by weight of the fraction soluble in xylene at 25° C.;

C$_4$=% by weight of butene units in the copolymer;

e=1.47;

f=0.08;

and the copolymers, the process comprising contacting ethylene and butene in the presence of a catalyst comprising:

(A) a solid component comprising a titanium compound supported on a magnesium chloride in active form and an electron-donor compound;

(B) an alkyl-Al compound; and (C) an electron donor-compound selected from the group of 1,3-diethers of formula (I):

(I)

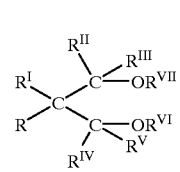

wherein R, R$^I$, R$^{II}$, R$^{III}$ R$^{IV}$, and, R$^V$, which are identical or different, are hydrogen or linear or branched alkyl radicals, cycloalkyl radicals, aryl radicals, alkylaryl radicals or arylalkyl radicals having 1–18 carbon atoms;

with the limitation that R and R$^I$ cannot simultaneously be hydrogen and that at least one of R and R$^I$ is a secondary or tertiary hydrocarbon radical selected from alkyl, cycloalkyl, or aromatic groups;

wherein R$^{VI}$ and R$^{VIII}$, which are identical or different, are linear or branched alkyl radicals, cycloalkyl radicals, aryl radicals, alkylaryl radicals or arylalkyl radicals having 1–18 carbon atoms;

and further wherein at least two of the radicals R, R$^I$, R$^{II}$, R$^{III}$, R$^{IV}$, R$^V$, R$^{VI}$, and R$^{VII}$ can be linked together to form one or more cyclic structures.

23. Process according to claim 22, in which the titanium compound present in the solid component (A) contains at least one Ti-halogen bond.

24. Process according to claim 23, in which the titanium compound has the formula Ti(OR)$_{n-y}$X$_y$, where X is a halogen, n is the valency of the titanium and y is a number between 1 and n.

25. Process according to claim 23, in which the titanium compound is TiCl$_4$.

26. Process according to claim 22, in which the internal electron-donor compound is selected from esters, ethers, amines, silanes and ketones.

27. The process according to claim 26, in which the internal electron-donor compound is selected from alkyl, cycloalkyl or aryl esters of monocarboxylic acids and polycarboxylic acids, the alkyl, cycloalkyl or aryl groups having from 1 to 18 carbon atoms.

28. The process according to claim 22, in which the solid component (A) has a surface area of between 20 and 400 m$^2$/g, and a porosity greater than 0.2 cm$^3$/g.

29. Process according to claim 22, in which the alkyl-Al compound (B) is selected from the following trialkyl-aluminums: trimethyl-Al, triethyl-Al, triisobutyl-Al, tri-n-butyl-Al, and tri-n-octyl-Al.

30. The process according to claim 22, in which at least one of R and R$^I$ is selected from isopropyl, sec-butyl, tert-butyl, cyclobutyl, cyclopentyl, and phenyl, which are optionally substituted.

31. Process according to claim 22, in which the electron-donor compound (C) is selected from: 2,2-diphenyl-1,3-dimethoxypropane, 2,2-bis(cyclo-hexylmethyl)-1,3-dimethoxypropane, 2,2-diisopropyl-1,3-dimethoxypropane, 2-isopropyl-2-cyclohexylmethyl-1,3-dimethoxypropane, 2,2-dicyclopentyl-1,3-dimethoxy-propane, and 2-isopropyl-2-isopentyl-1,3-dimethoxypropane.

32. Process according to claim 22, in which the polymerization is carried out in suspension, using inert hydrocarbon diluents as liquid phase.

33. Process according to claim 22, in which the process is carried out in liquid propylene.

34. Process according to claim 22, in which the polymerization is carried out at temperatures of between 20 and 120° C. and under pressures of between 0.5 and 10 MPa.

35. The process according to claim 27, wherein the internal electron-donor compound is selected from alkyl, cycloalkyl, or aryl esters of benzoic acid, phthalic acid, or maleic acid.

36. The process according to claim 28, wherein the solid component (A) has a surface area of between 50 and 350 m$^2$/g.

37. The process according to claim 28, wherein the solid component (A) has a porosity of between 0.2 and 0.5 cm$^3$/g.

38. The process according to claim 28, wherein between 1.4 and 8.2% by weight of the copolymer is derived from butene, solid component (A) has porosity of between 0.2 and 0.5 cm$^3$/g and a surface area of between 50 and 350 m$^2$/g, component (B) is triethylaluminum, the ratio of component (A) to component (B) is between 0.02 and 0.09, the ratio of component (C) to component (B) is between 0.6 and 1, the polymerization reaction is in the presence of between 600 and 1200 cm$^3$ H$_2$ per liter of the reaction vessel and the polymerization reaction is carried out at 70° C.

39. The process according to claim 22, wherein R$^{VI}$ and R$^{VII}$ are methyl groups.

40. The process according to claim 22, wherein R$^{II}$, R$^{III}$, R$^{IV}$, and R$^V$ are hydrogen.

41. The process according to claim 22, wherein R$^{II}$, R$^{III}$, R$^{IV}$, and R$^V$ are hydrogen, and R$^{VI}$ and R$^{VII}$ are methyl groups.

42. The process according to claim 22, wherein between 1.4 and 8.2% by weight of said copolymer is derived from butene, solid component (A) has a porosity of between 0.2 and 0.5 cm$^3$/g and a surface area of between 50 and 350 m$^2$/g, component (B) is triethylaluminum, the ratio of component (A) to component (B) is between 0.02 and 0.09, the ratio of component (C) ) to component (B) is between 0.6 and 1;

the polymerization reaction is in the presence of between 600 and 1200 cm$^3$ H$_2$ per liter of the reaction vessel, and the polymerization reaction is carried out at 70° C.

\* \* \* \* \*

UNITED STATES PATENT AND TRADEMARK OFFICE
CERTIFICATE OF CORRECTION

PATENT NO.    : 6,365,685 B1
DATED         : April 2, 2002
INVENTOR(S)   : Gianni Collina et al.

It is certified that error appears in the above-identified patent and that said Letters Patent is hereby corrected as shown below:

<u>Title page,</u>
Item [73], Assignee, please change "Remall North America" to -- Basell North America --.

Signed and Sealed this

Ninth Day of July, 2002

Attest:

Attesting Officer

JAMES E. ROGAN
*Director of the United States Patent and Trademark Office*